US007225058B1

(12) United States Patent
Porter

(10) Patent No.: US 7,225,058 B1
(45) Date of Patent: May 29, 2007

(54) MODULAR IRRIGATION CONTROLLER WITH INDIRECTLY POWERED STATION MODULES

(75) Inventor: Lamonte D. Porter, San Marcos, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

(21) Appl. No.: 11/340,179

(22) Filed: Jan. 25, 2006

(51) Int. Cl.
*G06F 19/00* (2006.01)
*A01G 25/16* (2006.01)

(52) U.S. Cl. .................. 700/284; 239/69; 137/624.11; 174/53; 174/50

(58) Field of Classification Search ................. 700/16, 700/282–284; 239/63, 69; 137/624.11; 174/50, 53
See application file for complete search history.

(56) References Cited

U.S. PATENT DOCUMENTS

| | | | |
|---|---|---|---|
| 5,262,936 A | 11/1993 | Faris et al. ................. 364/140 |
| 6,459,959 B1 | 10/2002 | Williams et al. ............ 700/284 |
| 6,842,667 B2 | 1/2005 | Beutler et al. .............. 700/284 |
| 7,069,115 B1 * | 6/2006 | Woytowitz .................. 700/284 |
| 2004/0225411 A1 * | 11/2004 | Beutler et al. .............. 700/284 |
| 2005/0038529 A1 * | 2/2005 | Perez et al. .................. 700/19 |
| 2005/0055106 A1 * | 3/2005 | Beutler et al. ................ 700/11 |
| 2006/0030971 A1 * | 2/2006 | Nelson et al. .............. 700/284 |

* cited by examiner

*Primary Examiner*—Leo Picard
*Assistant Examiner*—Douglas S. Lee
(74) *Attorney, Agent, or Firm*—Michael H. Jester

(57) ABSTRACT

An irrigation controller includes inputs for entry or selection of a watering program and a memory capable of storing the watering program. A plurality of station modules are removably received in a plurality of corresponding receptacles. Each station module includes a station module circuit for switching a source of electrical power to open and close at least one of a plurality of valves. A processor is connectable to the station modules when the station modules are inserted into the receptacles. The processor is capable of executing the watering program and sending commands to the station module circuits to open and close the valves in accordance with the watering program. A manually actuable mechanism allows a power signal to be applied to each station module circuit after the station modules have been inserted into their corresponding receptacles.

18 Claims, 11 Drawing Sheets

MODULAR IRRIGATION CONTROLLER WITH INDIRECTLY POWERED STATION MODULES

FIELD OF THE INVENTION

The present invention relates to electronic irrigation controllers that control valves which supply water to sprinklers, and more particularly, to modular irrigation controllers that can be configured on site to control more zones or stations.

BACKGROUND

Residential and commercial irrigation systems for turf and landscaping typically include one or more solenoid operated valves that are turned ON and OFF by an electronic irrigation controller. The valves admit water to various branch lines in the form of subterranean pipes that each supply several sprinklers connected at spaced intervals. Each combination of a solenoid valve and its associated sprinklers is referred to in the irrigation industry as a zone or station. A modern electronic irrigation controller typically includes a microprocessor that executes one or more stored watering programs. These watering programs are typically programmed or selected by the user via push button and/or rotary knob. The controller usually has a liquid crystal display (LCD) to facilitate programming by the user. The microprocessor controls the solenoid valves via suitable drivers and switching devices. The valves are opened and closed by the microprocessor in accordance with the programmed run and cycle times for each of the stations.

Modular expandable irrigation controllers have gained increasing popularity in both residential and commercial landscape applications. In a modular irrigation controller, the base portion of the irrigation controller contains the microprocessor and user actuated manual controls. Each station is then controlled by a corresponding station module which comprises a plastic housing that supports a station module circuit, as well as wire connection terminals for connecting wires that lead to a plurality of solenoid actuated irrigation valves. Typically each station module can independently control more than one solenoid actuated valve. The station modules contain pins, sockets, card edge connectors or some other standard form of electro-mechanical connectors for allowing them to be connected and disconnected from the base portion of the irrigation controller. The station modules are typically inserted into receptacles in either the housing that contains the microprocessor or a separate back panel connected to the microprocessor housing. A station module is typically connected to each solenoid actuated valve by a dedicated field valve line, for example, twelve gauge wire. A common return line is connected between all of the valves and the irrigation controller. Triacs in the station module circuit are typically used to switch a twenty-four volt AC power signal ON and OFF relative to each of the field valve lines.

The principal advantage of a modular expandable irrigation controller is that the base portion of the controller need only be equipped with the minimum number of station modules that can control the total number of stations required to irrigate the turf and/or landscaping of a particular system installation. Thus, for example, an irrigation system may have only three zones, requiring only a single station module, while another may have twelve zones which might require four station modules. Considerable cost savings are thus achieved and the distributor need not stock a wide size range of irrigation controllers. Moreover, if an irrigation system expands after initial installation because the landscaping has increased, additional station modules can be added. Furthermore, if a station module is damaged by a lightening strike, or otherwise fails, it can be replaced.

One drawback of conventional modular irrigation controllers is that the user typically connects the field vale lines to the station modules when the AC power to the modules is "live," presenting a risk of electric shock. If an indoor mounted controller is first disconnected from the AC wall outlet, there is a risk that the watering programs stored in the controller will be lost. Outdoor mounted controllers are usually hard-wired to an AC power source. To reduce the risk of electric shock, the user must first locate and turn off a circuit breaker, typically at a remote and inconvenient location, before connecting or re-connecting field valve line wires. Again, there is a risk of losing the watering programs when the power is shut off to the irrigation controller in this fashion.

Yet another problem with conventional modular controllers is that replacement of a damaged or defective station module requires disconnection and re-connection of the field valve lines to the station module. This is tedious, and often leads to mis-connection of the field valve lines when more than one station module is replaced at the same time.

SUMMARY

According to an embodiment of the present invention, a modular irrigation controller includes a processor for executing a watering program and turning a plurality of irrigation valves ON and OFF in accordance with the watering program. The controller further comprises a plurality of station modules, each including a station module circuit connectable to at least one of the irrigation valves. The controller further comprises a plurality of receptacles that establish communication between the processor and each station module circuit when the station modules are inserted into corresponding ones of the receptacles. A manually actuable mechanism allows a power connection to be applied to the station module circuit of each station module after it has been inserted into its corresponding receptacle.

BRIEF DESCRIPTION OF THE DRAWINGS

Throughout the drawing figures like reference numerals refer to like parts.

DETAILED DESCRIPTION

The entire disclosures of the following U.S. patents and applications are hereby incorporated by reference: U.S. Pat. No. 5,097,861 granted Mar. 24, 1992 of Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 5,829,678 granted Nov. 3, 1998 of Richard E. Hunter et al. entitled SELF-CLEANING IRRIGATION REGULATOR VALVE APPARATUS; U.S. Pat. No. 6,088,621 granted Jul. 11, 2000 also of Peter J. Woytowitz et al. entitled PORTABLE APPARATUS FOR RAPID REPROGRAMMING OF IRRIGATION CONTROLLERS; U.S. Pat. No. 6,721,630 granted Apr. 13, 2004 also of Peter J. Woytowitz entitled EXPANDABLE IRRIGATION CONTROLLER WITH OPTIONAL HIGH-DENSITY STATION MODULE; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; pending U.S. patent application Ser. No. 10/848,394 filed May 17, 2004 also of Peter J. Woytowitz entitled ISOLATED MODULAR EXPANDABLE IRRIGATION CONTROLLER; pending U.S. patent application Ser. No. 10/883,283 filed Jun. 30, 2004 also of Peter J. Woytowiz entitled HYBRID MODULAR/DECODER IRRIGATION CONTROLLER; pending U.S. patent application Ser. No. 10/985,425 filed Nov. 9, 2004 also of Peter J. Woytowitz et al. and entitled EVAPOTRANSPIRATION UNIT CONNECTABLE TO IRRIGATION CONTROLLER; pending U.S. patent application Ser. No. 11/045,527 filed Jan. 28, 2005 also of Peter J. Woytowitz entitled DISTRIBUTED ARCHITECTURE IRRIGATION CONTROLLER; pending U.S. patent application Ser. No. 11/191,858 filed Jul. 28, 2005 also of Peter J. Woytowitz entitled MODULAR IRRIGATION CONTROLLER WITH SEPARATE FIELD VALVE LINE WIRING TERMINALS; pending U.S. patent application Ser. No. 11/251,690 filed Oct. 17, 2005 of Matthew G. Beutler et al. entitled MODULAR IRRIGATION CONTROLLER; and pending U.S. patent application Ser. No. 11/288,831 filed Nov. 29, 2005 of LaMonte D. Porter et al. entitled EVAPOTRANSPIRATION UNIT FOR RE-PROGRAMMING AN IRRIGATION CONTROLLER. The aforementioned U.S. patents and applications are all assigned to Hunter Industries, Inc., the assignee of the subject application.

Figure 1:
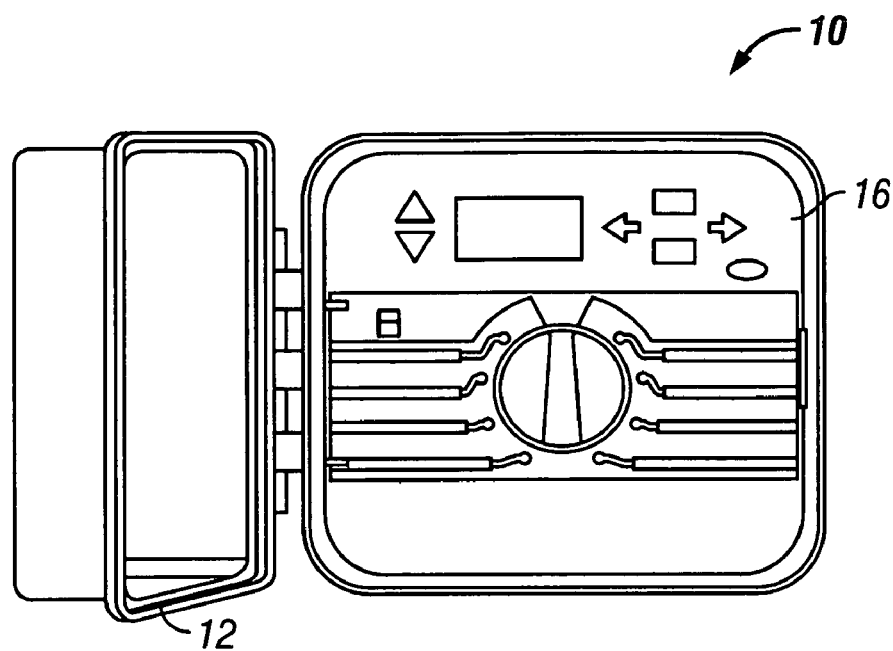
FIG. 1 is an isometric view of an irrigation controller in accordance with an embodiment of the present invention with its front door open to reveal its removable face pack.
Figure 2:
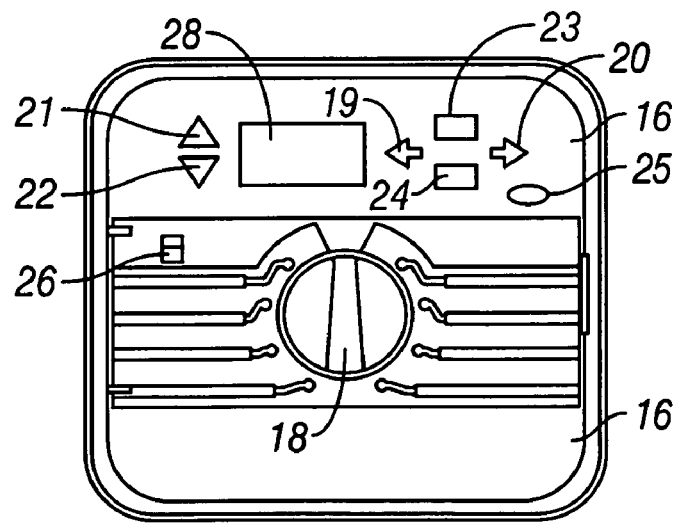
FIG. 2 illustrates the removable face pack of the irrigation controller of FIG. 1.
Figure 4:
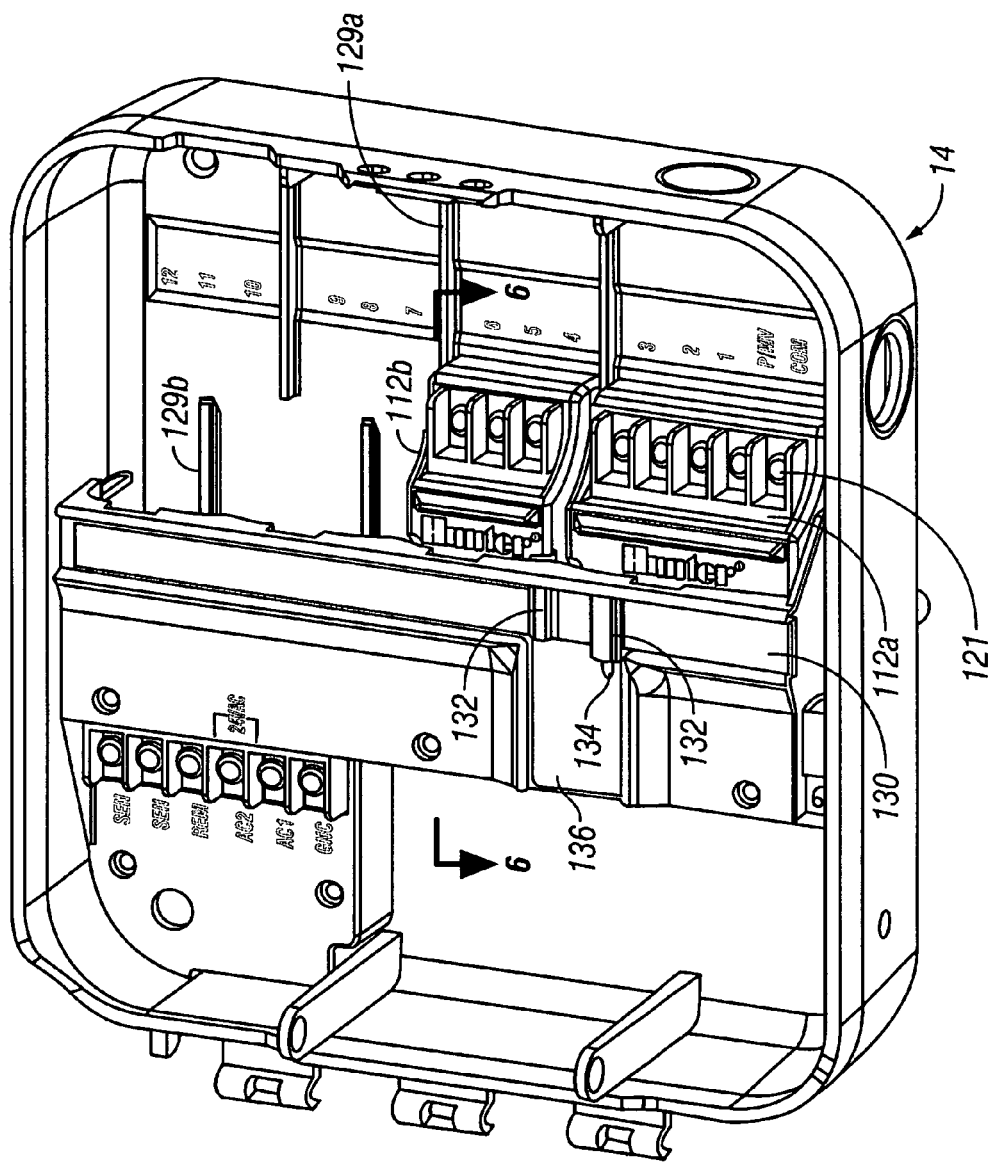
FIG. 4 is an enlarged isometric view of the back panel of the irrigation controller of FIG. 1 illustrating two station modules plugged into their respective receptacles.

Referring to FIGS. 1 and 2, an irrigation controller 10 in accordance with an embodiment of the present invention includes a wall-mountable plastic housing structure in the form of a generally box-shaped front door 12 hinged along one vertical edge to a generally box-shaped back panel 14 (FIG. 4). A generally rectangular face pack 16 (FIG. 2) is removably mounted over the back panel 14 and is normally concealed by the front door 12 when not being accessed for programming. The face pack 16 has a plurality of manually actuable controls including a rotary knob switch 18 and push button switches 19, 20, 21 22, 23, 24 and 25 as well as slide switch 26. These manual controls can be manipulated in conjunction with numbers, words and/or graphic symbols indicated on a liquid crystal display (LCD) 28 for entering or selecting a watering program as is well known in the art of electronic irrigation controllers. Custom watering programs can be created by the user by manipulating the rotary knob switch 18 and selected ones of the push button switches 19, 20, 21 22, 23, 24 and 25. The custom watering program can be a complex set of run time and cycle programs, or a portion thereof, such as a simple five minute cycle for a single station. Alternatively, existing pre-programmed watering programs can be selected, such as watering all zones every other day for five minutes per zone.

The face pack 16 (FIGS. 1 and 2) encloses and supports a PC board (not illustrated) with a processor for executing and implementing a stored watering program. An electrical connection is made between the face pack 16 and electrical components in the back panel 14 through a ribbon cable (not illustrated). The circuitry inside the face pack 16 can be powered by a battery to allow a person to remove the face pack 16, un-plug the ribbon cable, and walk around the lawn, garden or golf course while entering a watering program or altering a pre-existing watering program.

Figure 3:
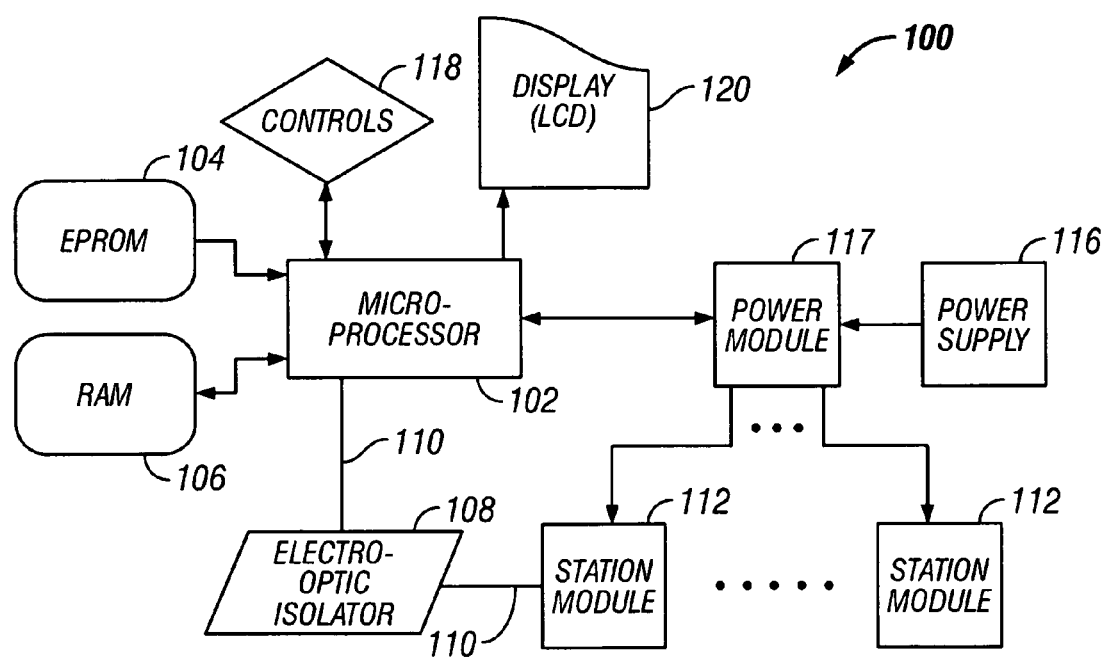
FIG. 3 is a simplified block diagram of the electronic portion of the irrigation controller of FIG. 1.

FIG. 3 is a simplified block diagram of the electronic portion of the irrigation controller 10. A processor, in the form of micro-processor 102 is mounted on the PC board inside the face pack 16. The micro-processor 102 executes a selected watering program stored in a program memory in the form of EPROM 104 using a data memory in the form of RAM 106. The processor 50 may comprise a micro-controller that uses separate memory, or a micro-computer with on-chip memory that serves the same functions as the EPROM 104 and RAM 106. The manually actuable controls 118 and the LCD display 28 of the controller 10 are interfaced with the processor micro-processor 102 in the usual fashion. The micro-processor 102 is connected through suitable input/output (I/O) devices (not illustrated), electro-optic isolators 108 and a bus 110 that is routed through the ribbon cable to a plurality of station modules 112. The station modules 112 are removably mounted in receptacles formed in the back panel 14. A power supply 116 located in the back panel 14 is connectable to a standard 110 volt AC source (not illustrated) and supplies electrical power to a power module 117. The power module 117 in turn supplies twenty-four volt AC power to the station modules 112 and five volt DC power to the micro-processor 102 through the ribbon cable.

The micro-processor 102 (FIG. 3) controls the station modules 112 and any master module in accordance with one or more watering programs. Serial or multiplexed communication is enabled over the bus 110 so that all of the information as to which stations or zones should be turned ON and OFF at any given time is present at each receptacle. Suitable synchronous serial data and asynchronous serial data station module circuits are disclosed in the aforementioned U.S. Pat. No. 6,721,630. The station modules 112 each include a small PC board which supports a station module circuit preferably including a micro-controller as well as multiple switching devices for switching the twenty-four volt AC power signal ON and OFF to different solenoid actuated valves (not illustrated). Typically the solenoid actuated valves are mounted in subterranean plastic boxes (not illustrated) relatively close to the controller 10 As used in the claims hereinafter, the term "irrigation valve" includes any type of remotely controlled valve useable in an irrigation system that may or may not employ a solenoid.

FIG. 4 illustrates two station modules 112a and 112b installed in side-by-side fashion in station module receptacles located in the back panel 14. The wider station module 112a is a base module that connects to three valves and also has terminals for connecting a pump relay wire and a pump relay common wire. The modules 112a and 112b have screw terminals 121 located at their rear ends for connecting the stripped ends of field valve lines typically comprising twelve gauge wires. Each station module, such as 112b (FIG. 5) comprises an outer generally rectangular plastic housing 122 with a slot 124 at its forward end. A small PC board 125 (FIG. 6) is mounted inside the station module housing 122 and supports the station module circuit. The station module circuit includes a micro-controller and triacs as well as conductive traces that lead to the screw terminals 121 and to a four generally V-shaped spring-type electrical contacts 126 (FIG. 5) accessible via the slot 124. The contacts 126 register with corresponding electrical contacts on the underside of a PC board 128 (FIGS. 6 and 7) mounted inside the back panel 14 when the module 112b is slid into its corresponding receptacle. The station modules 112a and 112b and the PC board 128 in the back panel 14 are thus electrically and mechanically connected in releasable fashion through a so-called "card edge" connection scheme when the station modules 112a and 112b are inserted or plugged into their respective receptacles.

The circuit on the PC board 128 (FIGS. 6 and 7) connects the station modules 112a and 112b to the processor 102 (FIG. 3) via the electro-optic isolators 108, bus 110 and ribbon cable. The receptacles of the irrigation controller 10 include upstanding vertical side walls 129a and center ridges 129b (FIG. 4) formed on a bay or receptacle region of the back panel 14. The side walls 129a and center ridges 129b support the station modules 112a and 112b and ensure that they mate with their respective card edge connectors in the preferred orientation within the back panel 14. The term "receptacle," as used in the claims hereafter, should be broadly construed as any structure, or region of a structure, for removably receiving and supporting a plurality of individual station modules inside, or adjacent to, the remaining portion of an irrigation controller and establishing communication with other electronic components of the irrigation controller.

A locking bar 130 (FIG. 4) can be manually slid up and down in FIG. 4 between unlocked and locked positions to simultaneously secure and un-secure the station modules 112a and 112b after they have been fully inserted into their respective receptacles. Opposing raised projections 132 formed on the locking bar 130 facilitate sliding the locking bar 130 with a thumb. A pointer 134 extends from one of the raised projections 132 and serves as a position indicator that aligns with UNLOCKED and LOCKED indicia (not illustrated) formed in or applied to the upper surface of a generally rectangular housing 136 mounted inside back panel 14.

Figure 5:
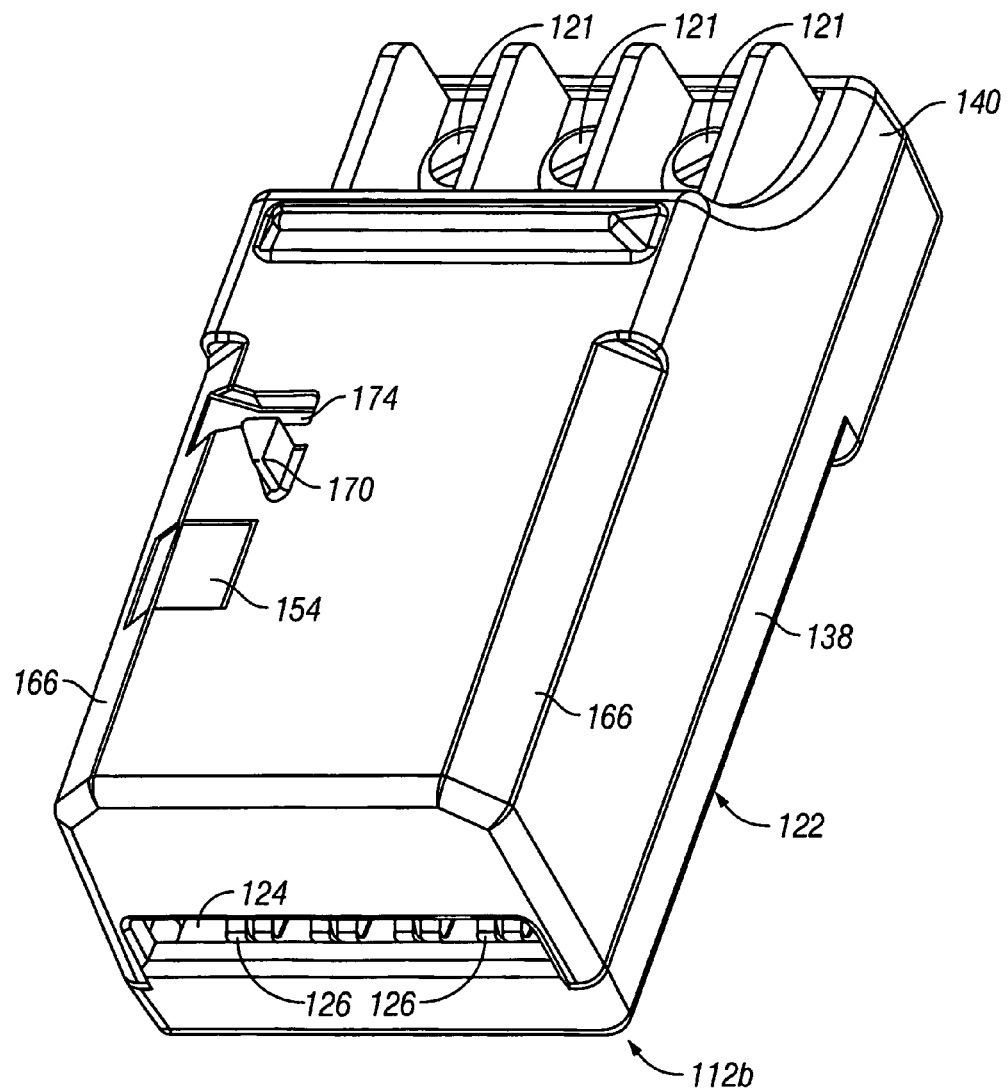
FIG. 5 is an enlarged isometric view of one of the station modules illustrated in FIG. 4.
Figure 6:
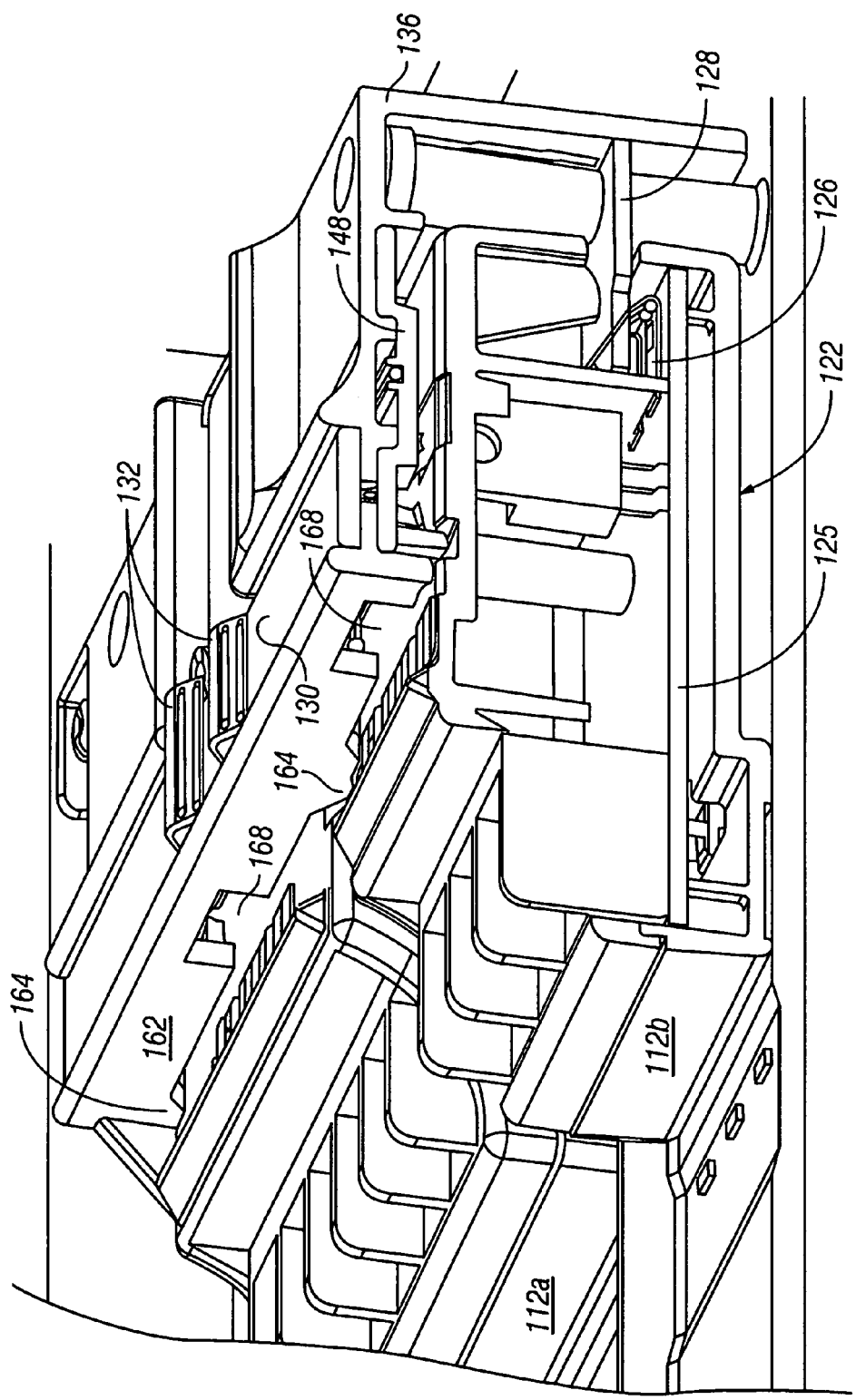
FIG. 6 is an enlarged sectional view taken along line 6—6 of FIG. 4, drawn in isometric fashion and illustrating further details of the irrigation controller of FIG. 1.

Referring to FIG. 5, each station module, such as 112b, includes a lower piece 138 that supports the PC board 125 (FIGS. 6 and 7) which in turn supports the screw terminals 121 and the contacts 126. An upper cover piece 140 (FIG. 5) fits over the lower piece 138 and is secured thereto by any suitable means such as screws, adhesive, sonic welding, or snap-in mechanisms (not illustrated). The station module 112b can be constructed so that the PC board 125 is supported by the upper cover piece 140, while the screw terminals 121 and contacts 126 are still supported by the lower piece 138. Conductive paths can then be established between the screw terminals 121, contacts 126 and the station module circuit via conductive pads and spring-like metal contacts (not illustrated) when the lower piece 138 and the upper cover piece 140 are mated and secured together with screws. This arrangement allows the cover piece 140 and its station circuit to be removed and replaced if damaged or defective, without having to remove the entire station module and re-wiring the field valve lines to the screw terminals 121.

Figure 7:
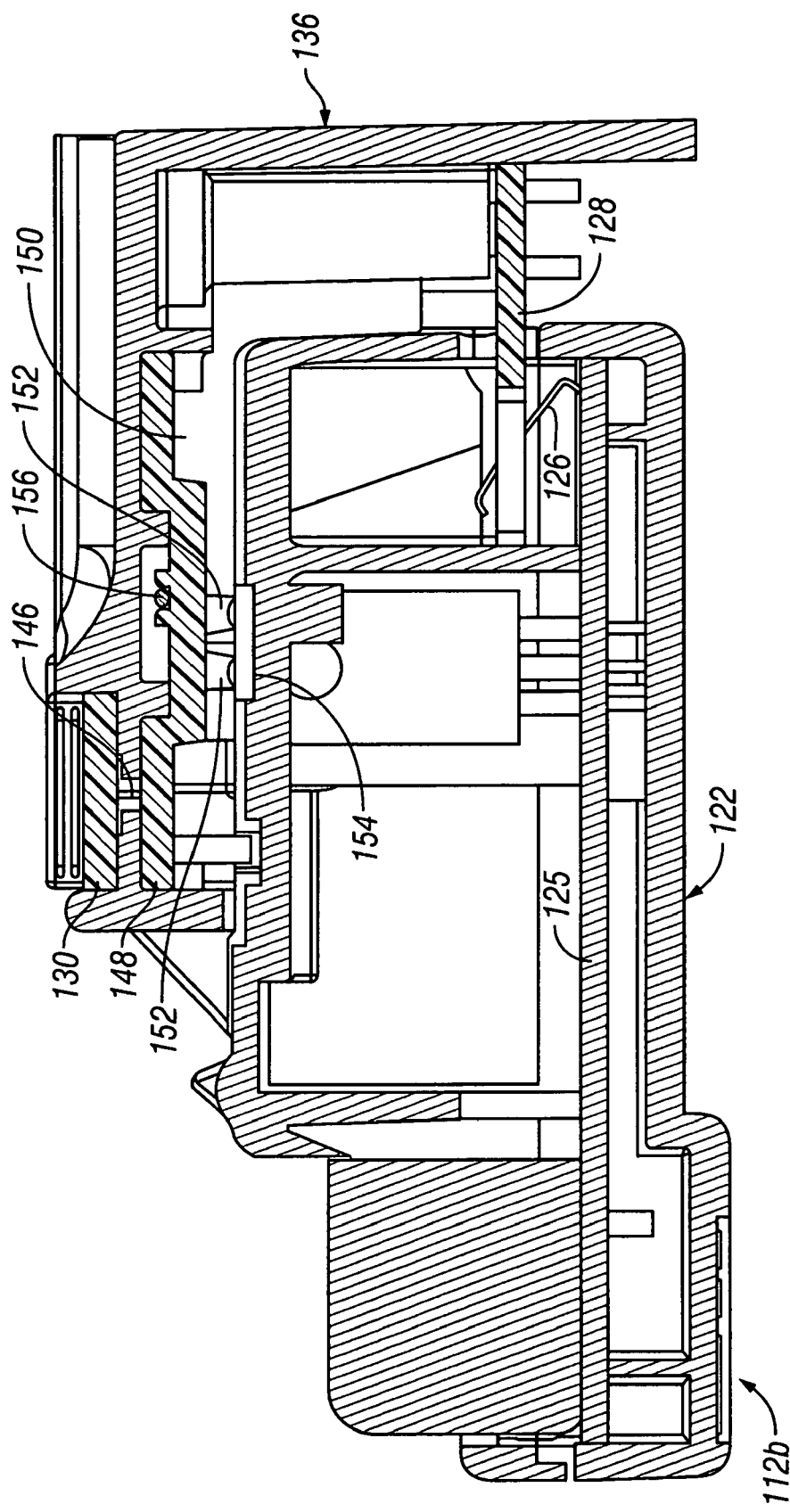
FIG. 7 is a sectional view similar to FIG. 6 drawn without any isometric aspect.
Figure 8:
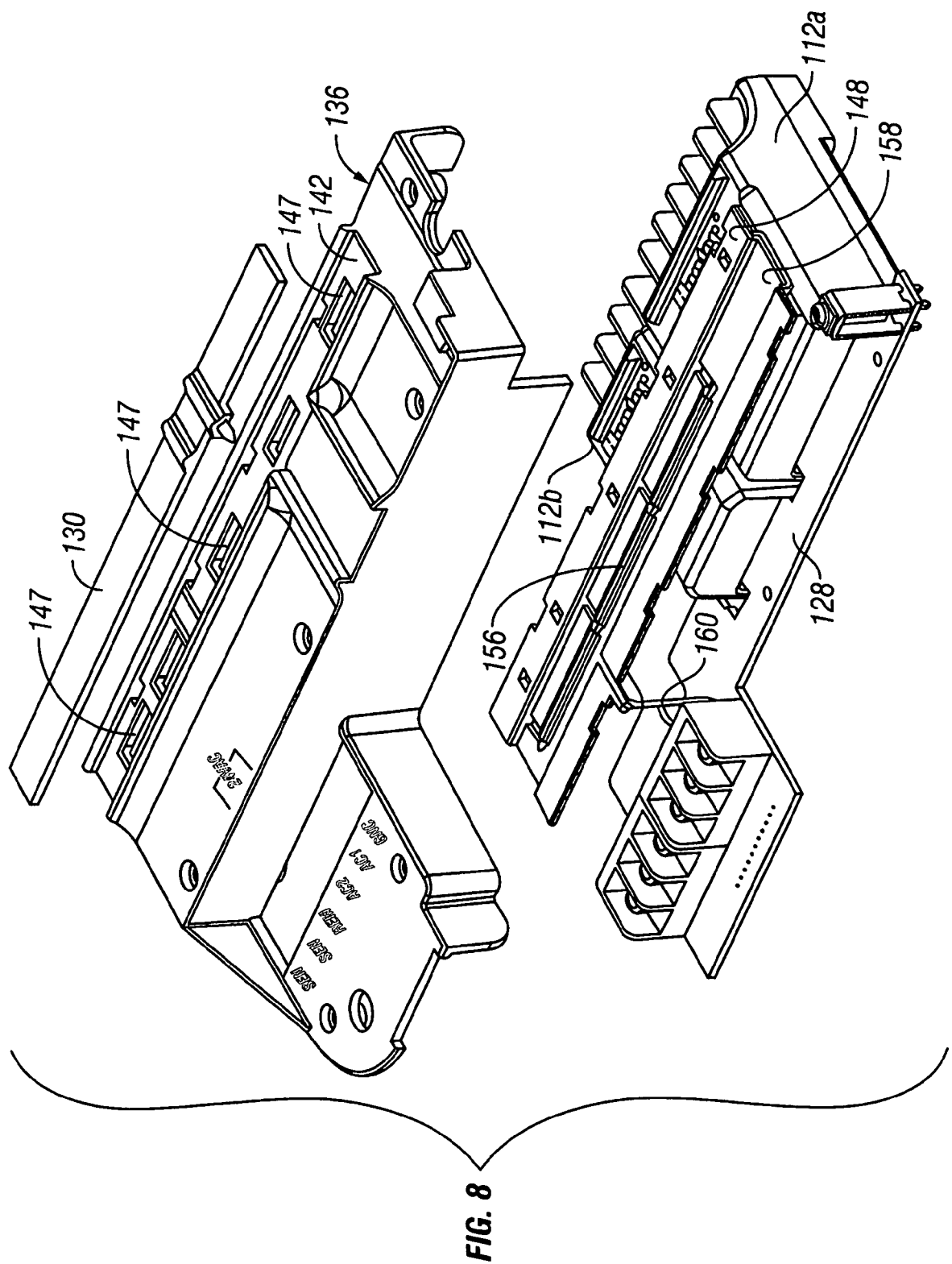
FIG. 8 is an exploded isometric view of portions of the structure mounted in the back panel of FIG. 4 that support the sliding locking bar.

Referring to FIG. 8, the locking bar 130 slides in a track 142 formed in the top of the housing 136. Vertical projections 146 (FIG. 7) extend through corresponding slots 147 (FIG. 8) in the track 142 and connect the locking bar 130 to a slide frame 148. Pairs of metal spring finger-like contacts 152 (FIG. 11) extend from the underside of the slide frame 148 at spaced intervals and can slide into, and out of, engagement with electrical contacts on the top surface of the station modules such as contact 154 (FIGS. 5 and 7) on the station module 112b. The contacts 154 are located on the top side of the station modules 112a and 112b, remote from the contacts 126 (FIG. 5) that engage the card edge connector contacts on the PC board 128. Each contact 154 is electrically connected through a wire or other conductor (not illustrated) to the station module circuit on the corresponding PC board 125. A rigid conductor 156 (FIG. 8) is confined in a trough formed in a template 158 supported by the slide frame 148 and connects to each of the pairs of contacts 152. The conductor 156 is connected through a suitably flexible wire 160 to the PC board 128 for providing twenty-four volt AC power to each of the station modules 12 plugged into receptacles in the back panel 14.

Figure 9:
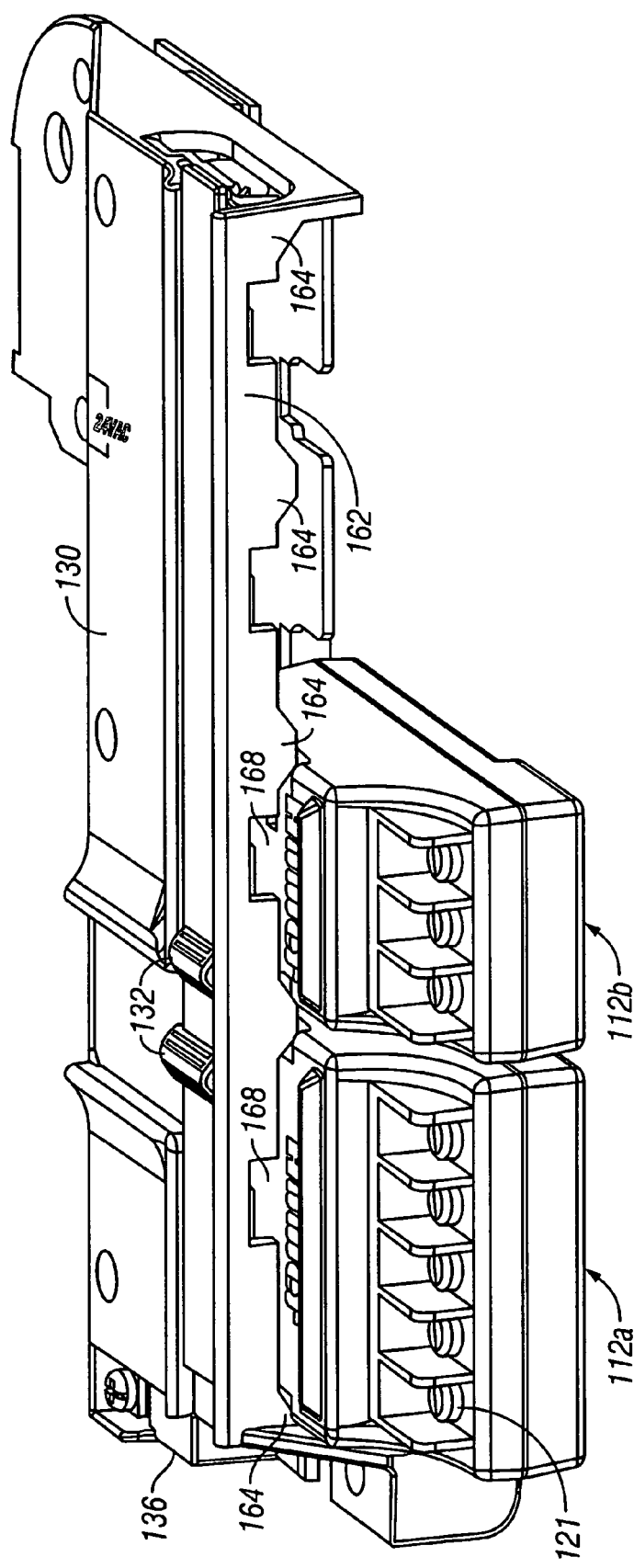
FIG. 9 is an isometric view of the components illustrated in FIG. 8 once assembled and illustrating the sliding locking bar in its unlocked position.

FIG. 9 illustrates the station modules 112a and 112b inserted into their respective receptacles and the locking bar 130 in its unlocked and unpowered position. The housing 136 has a downwardly extending front wall 162 with a plurality of generally triangular projections such as 164. The projections 164 fit between the chamferred top side edges 166 (FIG. 5) of the station modules such as station module 112b. The prevents the insertion of incompatible older generation station modules (not illustrated) that have square top side edges.

Rectangular recesses 168 (FIG. 11) in the front wall 162 provide clearance for projections such as 170 (FIG. 5) that extend upwardly from the top surface of each station module such as 112b. The projections 170 allow the modules 112a and 112b to be backwardly compatible with an older generation of the irrigation controller in which they are used to enable a slide lock to secure the modules in their respective receptacles. The housing 136, front wall 162 and projections 164 form part of the receptacles that receive and hold the station modules 112a and 112b in place in the back panel 14.

Vertical tabs 172 (FIGS. 11 and 12) extend downwardly from the front edge of the slide frame 148. The beveled leading edges of the vertical tabs 172 facilitate their penetration into laterally extending flared grooves 174 (FIG. 5) formed in the top side of the station modules such as 112b. This secures the station modules 112a and 112b in place in the back panel 14 and prevents them from being withdrawn from their receptacles when the spring finger-like contacts 152 are engaged with their respective top side contacts 154.

Figure 11:
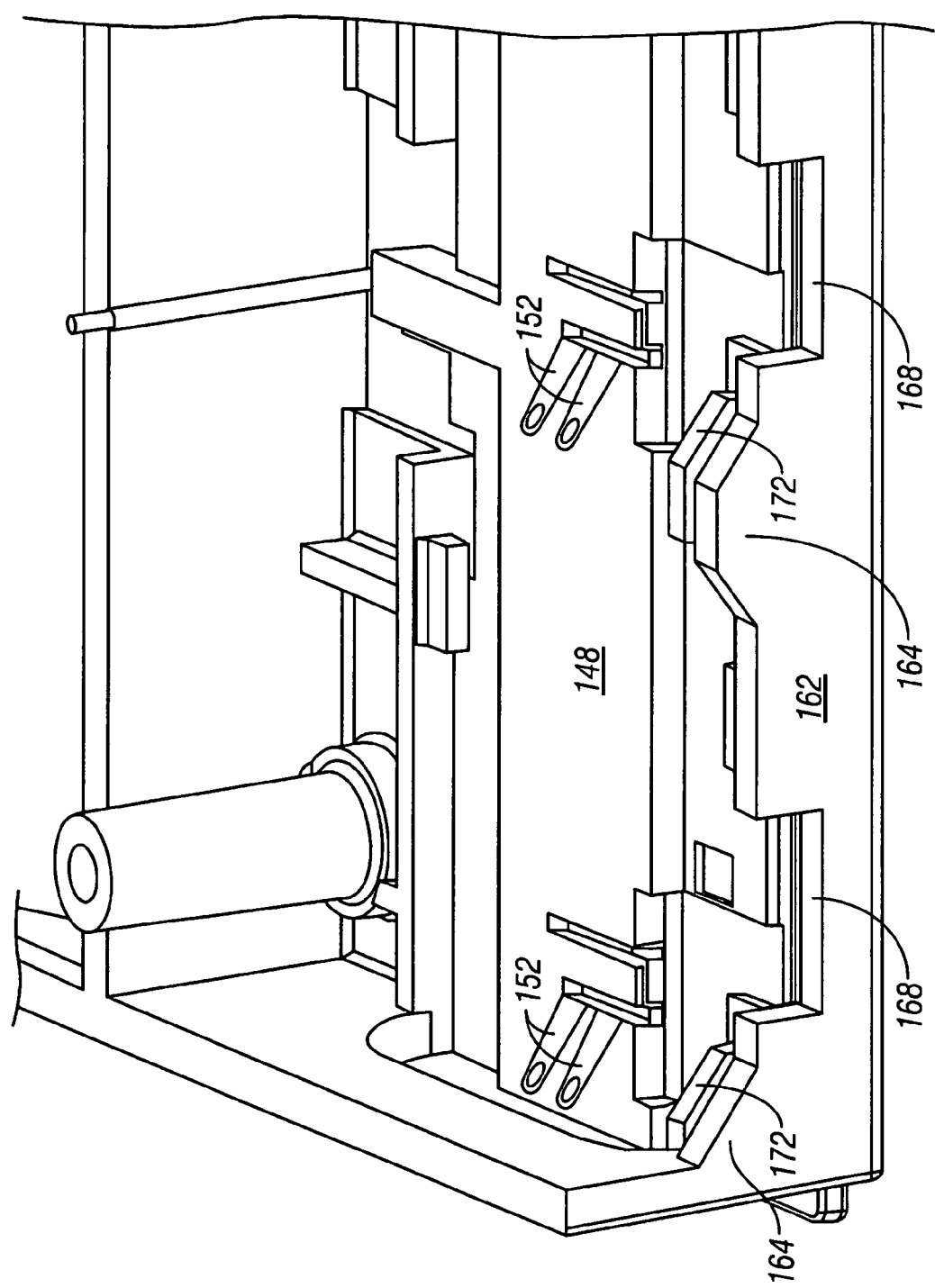
FIG. 11 is a still further enlarged fragmentary isometric view illustrating the underside of the assembled components of FIG. 9 when the sliding locking bar is in its unlocked position.

FIG. 11 illustrates the position of the slide frame 148 when the locking bar 130 is in its unlocked and unpowered position. In this configuration the finger-like contacts 152 are located to the left and the tabs 172 are withdrawn behind the adjacent projections 164 of the front wall 162 of the upper housing 144. The receptacles are thus clear and this allows the station modules 112a and 112b to be freely inserted and withdrawn from the same. Once the station modules 112a and 112b are inserted, the V-shaped spring-type electrical contacts 126 (FIG. 5) of the station modules 112a and 112b engage corresponding contacts on the PC board 128. However at this time no AC power has been supplied to the station modules 112a and 112b so the user is free to connect filed valve lines to the screw terminals 121 without the risk of electric shock.

Figure 10:
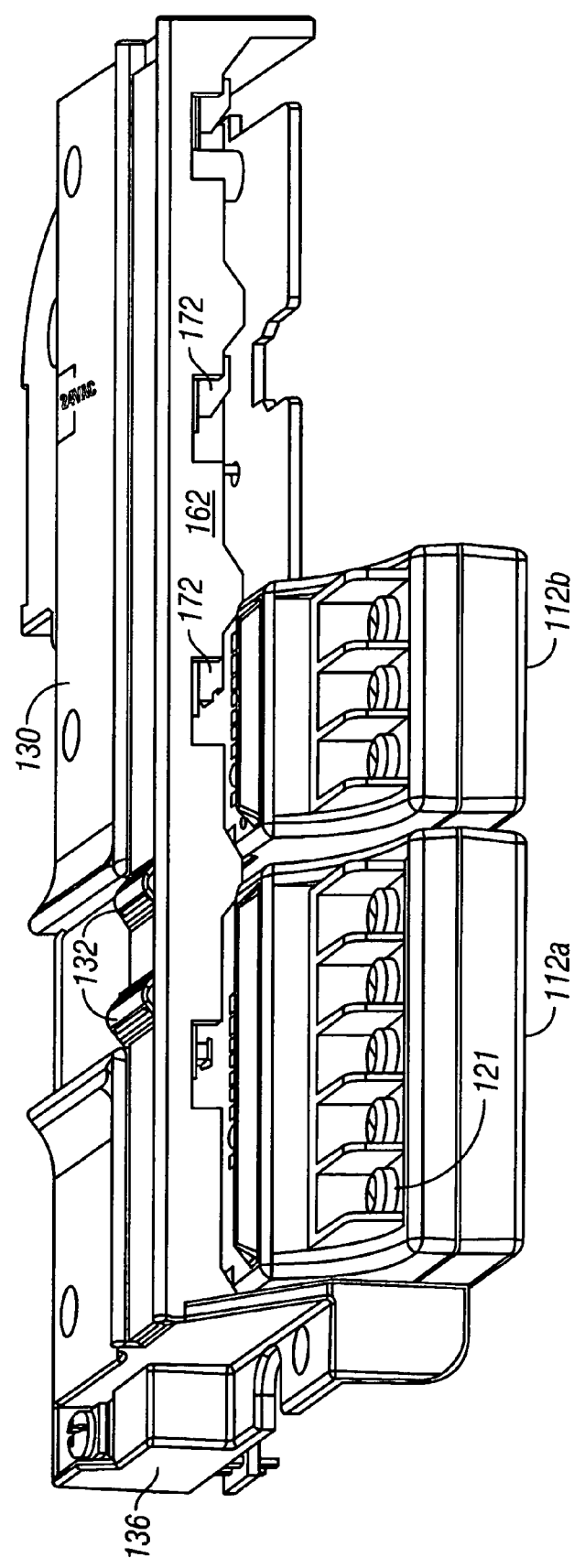
FIG. 10 is an isometric view similar to FIG. 9 taken from a different angle and illustrating the sliding locking bar in its locked position.
Figure 12:
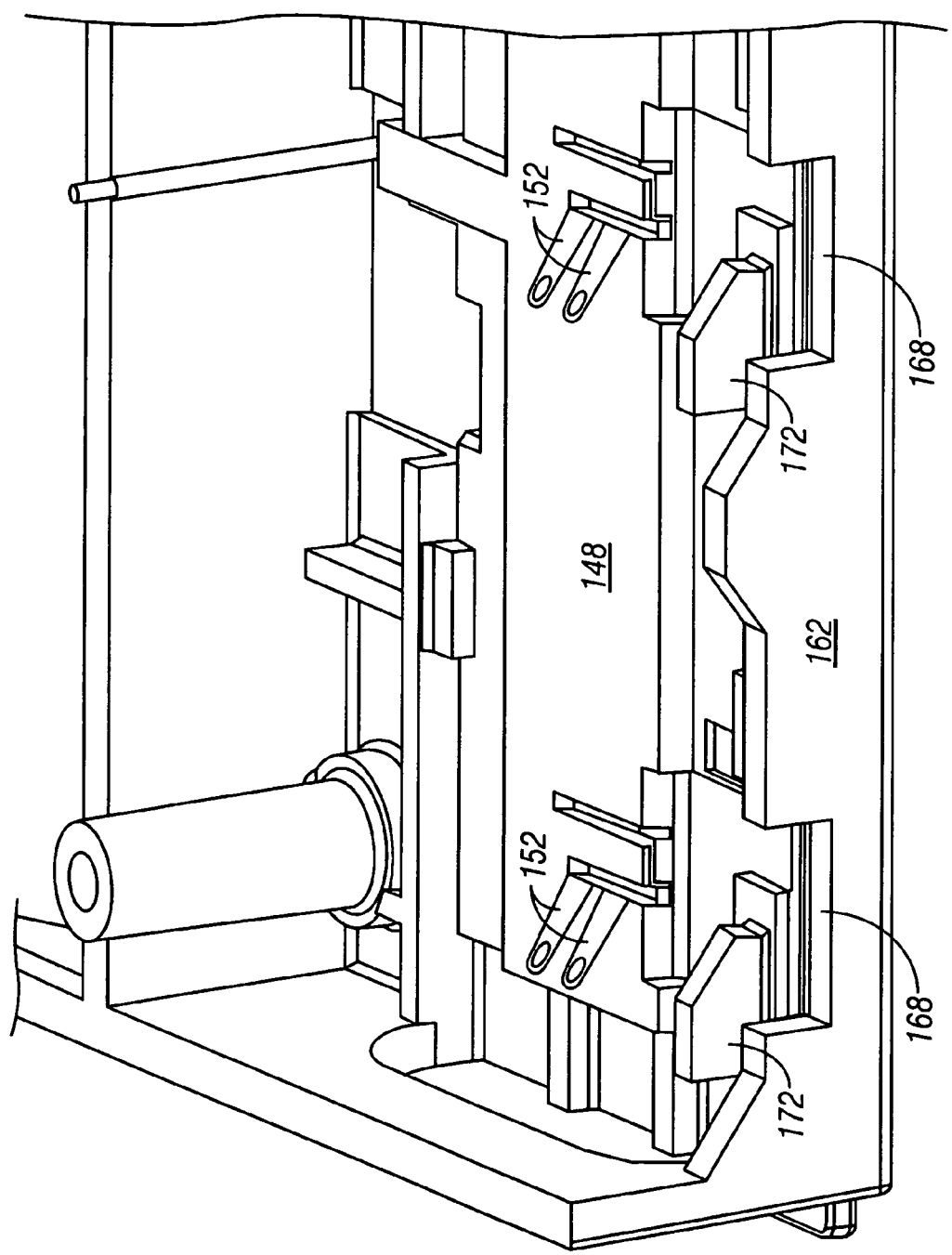
FIG. 12 is a view similar to FIG. 11 illustrating the sliding locking bar in its locked position.

When the locking bar 130 is slid downwardly to its locked and powered position, illustrated in FIG. 4, the slide frame 148 will move to the position illustrated in FIG. 12. The tabs 172 then partially block the entrances to their respective empty receptacles to prevent inadvertent insertion of station modules 112a and 112b at a time when the contacts 152 would be damaged. The station modules 112a and 112b are not illustrated in FIG. 11 so that the locations of the finger-like contacts 152 and tabs 172 can be seen. FIG. 10 illustrates the station modules 112a and 112b inserted into their respective receptacles and the locking bar 130 in its locked and powered position. When the locking bar 130 is moved to its locked and powered position, the tabs 172 slide into the grooves 174 of the station modules 112a and 112b if they have been fully inserted into their respective receptacles. This secures the station modules 112a and 112b in the back panel 14. When the locking bar 130 is slid to its locked position, the contacts 152 slide over the station module top side contacts 154 as best seen in FIG. 7.

While an exemplary embodiment of a modular irrigation controller with indirectly powered station modules has been described in detail, it will be apparent to those skilled in the art that the invention can be modified in both arrangement and detail. As an example, the irrigation controller 10 could be designed to control a predetermined number of valves, e.g. four, without requiring the insertion of any station modules. As another example, while the irrigation controller 10 utilizes means for locking the station modules in the receptacles that includes locking bar 130, other locking means can be utilized such as those disclosed and illustrated in the aforementioned co-pending U.S. patent application Ser. No. 11/251,690 filed Oct. 17, 2005. Persons skilled in the art will readily understand how to route twenty-four volt AC power through these various locking means to the individual station modules such that the AC power will only be supplied to the station modules when the station modules are locked in place in their respective receptacles. A mechanism could be manually actuated to apply a power connection to a module or to all the modules, which power connection may or may not be live. If the power connection is not live, it could be made live by other switch mechanisms. As yet another example, the station modules could be inserted into their receptacles, and without locking the modules in place, a push button could be actuated to apply the twenty four volt AC power signal to the station modules. As another example, the irrigation controller 10 can be modified to function as a hybrid modular/decoder controller as disclosed in the aforementioned co-pending U.S. patent application Ser. No. 10/883,283 filed Jun. 30, 2004. As another example, the station modules could be plugged vertically into corresponding outwardly opening box-like receptacles, and then individually locked with separate levers that would connect the twenty four volt AC power signal. In this alternate embodiment, the card edge connection scheme may be replaced by multi-pin connectors. See FIGS. 1–3 of the aforementioned U.S. Pat. No. 6,842,667. The communication between the station modules and the processor can be accomplished through direct physical electrical connection that establishes conductive paths, or the communication can be established through optical or wireless means. The electro-optic isolators 108 (FIG. 3) are not essential but do help protect the processor 102. Other receptacle constructions, and various processor-module communication schemes, are disclosed in various ones of the issued patents and pending applications incorporated by reference herein.

In addition to providing a novel modular expandable irrigation controller, those skilled in the art of irrigation controllers will appreciate that we have also provided a novel method of increasing the number of zones of an irrigation a controller. In one embodiment, this method includes the steps of providing a modular expandable irrigation controller and then plugging at least one station module into the irrigation controller to establish communication between the station module and a processor in the controller. This method further includes the step of manually actuating a mechanism to apply power to the station module. We have also provided a novel method of connecting a power signal to the station modules of a modular expandable irrigation controller. In one embodiment, this method includes the steps of providing a modular expandable irrigation controller and plugging at least one station module into the irrigation controller. This method further includes the steps of establishing communication between the station module and a processor in the controller through a first set of electrical contacts on a first side of the station module, and connecting a power signal to the station module through second set of electrical contacts located on second side of the station module.

Therefore, the protection afforded the present invention should only be limited in accordance with the following claims.

I claim:

1. A modular irrigation controller, comprising:
a processor for executing a watering program and turning a plurality of irrigation valves ON and OFF in accordance with the watering program;
a plurality of station modules each having a first set of electrical contacts and a station module circuit connectable to at least one of the irrigation valves;
a plurality of receptacles that establish each have a second set of electrical contacts that mate with the first set of electrical contacts to a communication path between the processor and each station module circuit when the station modules are inserted into corresponding ones of the receptacles;
a manually actuable mechanism that allows a power connection to be applied to the station module circuit of each station module after it has been inserted into its corresponding receptacle and the communication path has been established between the station module circuit and the processor; wherein power is applied to the station module circuit of each station module through a separate electrical contact located remote from the first and second sets of mating electrical contacts.

2. The controller of claim 1 wherein the manually actuable mechanism includes a sliding lock.

3. The controller of claim 1 wherein the manually actuable mechanism includes a rotating lock.

4. The controller of claim 2 wherein the lock can be slid to simultaneously lock each of the station modules in its corresponding receptacle and apply power to its station module circuit.

5. The controller of claim 1 wherein the receptacles are defined by a bay with side walls.

6. The controller of claim 1 wherein each station module includes a lower piece and an upper cover piece.

7. The controller of claim 1 wherein the processor and station module circuits communicate through a bus.

8. The controller of claim 2 wherein the sliding lock prevents insertion of station modules into empty receptacles when the lock is in a locked position.

9. A modular irrigation controller with indirectly powered station modules, comprising:
   means for entry or selection of a watering program;
   memory means for storing the watering program;
   a plurality of station modules, each including a station module circuit, for switching a source of electrical power to open and close a plurality of valves;
   receptacle means for removably receiving the station modules;
   a processor connectable to the station modules through a first set of electrical contacts when the station modules are received in the receptacle means and capable of executing the watering program and sending commands to the station module circuits to open and close the valves in accordance with the watering program; and
   means for locking the station modules in the receptacle means and connecting the source of electrical power to the station modules through a second set of electrical contacts, wherein a portion of the first set of electrical contacts is located in a first side of each station module and a portion of the second set of electrical contacts is located in a second side of each of the station modules.

10. The controller of claim 9 wherein the locking means includes a single locking bar that can be moved to simultaneously lock all of the station modules in the receptacles and connect them to the source of electrical power.

11. The controller of claim 10 wherein a portion of the second set of electrical contacts is mounted on the locking bar.

12. The controller of claim 9 wherein each station module includes a lower piece and a mating removable upper piece, the lower piece having a portion of the first set of electrical contacts and a plurality of terminals for connecting a plurality of field valve lines, and the upper piece including the station module circuit.

13. The controller of claim 9 wherein the locking means includes rotating levers.

14. The controller of claim 9 wherein the receptacle means are located in a back panel.

15. The controller of claim 14 wherein the receptacle means are partially defined by side walls that project from the back panel.

16. The controller of claim 11 wherein a conductor beneath the locking bar connects the source of electrical power to the portion of the second set of electrical contacts mounted on the locking bar.

17. An irrigation controller, comprising:
   manual controls for entry or selection of a watering program;
   a memory capable of storing the watering program;
   a plurality of station modules, each including a station module circuit, for switching a source of electrical power to open and close a plurality of irrigation valves;
   a plurality of receptacles for removably receiving the station modules;
   a processor connectable to each station module through a first set of electrical contacts when the station modules are inserted into the receptacles, the processor being capable of executing the watering program and sending commands to the station module circuits to open and close the irrigation valves in accordance with the watering program; and
   a manually actuable mechanism for connecting the source of electrical power to each station module through a second set of electrical contacts remote from the first set of electrical contacts after the station modules have been inserted into the receptacles.

18. A method of connecting a power signal to the station modules of a modular expandable irrigation controller, comprising the steps of:
   providing a modular expandable irrigation controller;
   plugging at least one station module into the irrigation controller;
   establishing a communication path between the station module and a processor in the controller through a first set of electrical contacts on a first side of the station module; and
   connecting a power signal to the station module ; and wherein the power application to the module and the locking of the module are performed substantially simultaneously through a second set of electrical contacts located on a second side of the station module.

* * * * *